US011382126B2

United States Patent
Takeda et al.

(10) Patent No.: US 11,382,126 B2
(45) Date of Patent: Jul. 5, 2022

(54) TRANSMISSION CONFIGURATION INDICATOR DETERMINATION FOR MIXED MODE OPERATION

(71) Applicant: QUALCOMM Incorporated, San Diego, CA (US)

(72) Inventors: Kazuki Takeda, Tokyo (JP); Alberto Rico Alvarino, San Diego, CA (US); Le Liu, Fremont, CA (US)

(73) Assignee: Qualcomm Incorporated, San Diego, CA (US)

( * ) Notice: Subject to any disclaimer, the term of this patent is extended or adjusted under 35 U.S.C. 154(b) by 22 days.

(21) Appl. No.: 16/947,138

(22) Filed: Jul. 20, 2020

(65) Prior Publication Data

US 2021/0037562 A1    Feb. 4, 2021

Related U.S. Application Data

(60) Provisional application No. 62/882,381, filed on Aug. 2, 2019.

(51) Int. Cl.
*H04W 72/12* (2009.01)
*H04W 72/04* (2009.01)
(Continued)

(52) U.S. Cl.
CPC ....... *H04W 72/1289* (2013.01); *H04L 12/189* (2013.01); *H04L 69/324* (2013.01);
(Continued)

(58) Field of Classification Search
CPC ............ H04L 5/0053; H04W 28/0278; H04W 28/10; H04W 74/0833; H04W 76/19; H04W 76/27
See application file for complete search history.

(56) References Cited

U.S. PATENT DOCUMENTS

2014/0119266 A1*  5/2014  Ng .................... H04L 27/2602
                                                          370/312
2020/0351888 A1*  11/2020  Xu ........................ H04W 80/02
(Continued)

FOREIGN PATENT DOCUMENTS

EP           2728787 A2      5/2014

OTHER PUBLICATIONS

CATT: "Further Discussion on TCI State Switching Requirements", 3GPP Draft, R4-1903226, 3GPP TSG-RAN4#90bis Meeting, TCI State Switching Delay, 3rd Generation Partnership Project (3GPP), Mobile Competence Centre, 650, Route Des Lucioles, F-06921, Sophia-Antipolis Cedex, France, vol. RAN WG4, No. Xi'an. China, Apr. 8, 2019-Apr. 12, 2019, Apr. 1, 2019 (Apr. 1, 2019), XP051713658, 3 Pages, Retrieved from the Internet: URL:http://www.3gpp.org/ftp/tsg%5Fran/WG4%5FRadio/TSGR4%5F90Bis/Docs/R4%2D1903226%2Ezip [retrieved on Apr. 1, 2019] Section 2.
(Continued)

*Primary Examiner* — Gary Mui
(74) *Attorney, Agent, or Firm* — Harrity & Harrity, LLP

(57) ABSTRACT

Various aspects of the present disclosure generally relate to wireless communication. In some aspects, a user equipment (UE) may determine a transmission type for a physical downlink shared channel, wherein the transmission type is a multicast transmission type or a unicast transmission type. The UE may determine, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel. The UE may decode the physical downlink shared channel based at least in part on the
(Continued)

transmission configuration indicator state. Numerous other aspects are provided.

30 Claims, 9 Drawing Sheets

(51) Int. Cl.
      *H04L 12/18*       (2006.01)
      *H04W 8/24*       (2009.01)
      *H04L 69/324*       (2022.01)

(52) U.S. Cl.
      CPC ........... *H04W 8/24* (2013.01); *H04W 72/048* (2013.01); *H04W 72/0466* (2013.01)

(56) References Cited

U.S. PATENT DOCUMENTS

| | | | | |
|---|---|---|---|---|
| 2020/0351892 A1* | 11/2020 | Yi | ......................... | H04L 5/0092 |
| 2020/0389883 A1* | 12/2020 | Faxer | .................... | H04L 5/0048 |
| 2021/0028898 A1* | 1/2021 | Takeda | .................. | H04L 5/0048 |
| 2021/0037603 A1* | 2/2021 | Li | ......................... | H04L 5/0048 |
| 2021/0044403 A1* | 2/2021 | Zhang | ............... | H04W 72/0406 |
| 2021/0045017 A1* | 2/2021 | Takeda | .................. | H04W 76/27 |
| 2021/0058906 A1* | 2/2021 | Seo | ........................ | H04L 5/0044 |

OTHER PUBLICATIONS

International Search Report and Written Opinion—PCT/US2020/070299—ISA/EPO—dated Oct. 13, 2020.
LG Electronics: "Remaining Issues on Downlink Control Channel", 3GPP Draft, R1-1810256, 3GPP TSG RAN WG1 Meeting #94bis, 3rd Generation Partnership Project (3GPP), Mobile Competence Centre, 650, Route Des Lucioles, F-06921 Sophia-Antipolis Cedex, France, vol. RAN WG1. No. Chengdu, China, Oct. 8, 2018-Oct. 12, 2018, Sep. 29, 2018 (Sep. 29, 2018),XP051517670, pp. 1-5, Retrieved from the Internet: URL:http://www.3gpp.org/ftp/tsg%5Fran/WG1%5FRL1/TSGR1%5F94b/Docs/R1%2D1810256%2Ezip [retrieved on Sep. 29, 2018] Section 2.4.

* cited by examiner

TRANSMISSION CONFIGURATION INDICATOR DETERMINATION FOR MIXED MODE OPERATION

CROSS-REFERENCE TO RELATED APPLICATION

This Patent Application claims priority to U.S. Provisional Patent Application No. 62/882,381, filed on Aug. 2, 2019, entitled "TRANSMISSION CONFIGURATION INDICATOR DETERMINATION FOR MIXED MODE OPERATION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for transmission configuration indicator determination for mixed mode operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a transmission type for a physical downlink shared channel, wherein the transmission type is a multicast transmission type or a unicast transmission type; determining, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel; and decoding the physical downlink shared channel based at least in part on the transmission configuration indicator state.

In some aspects, a UE for wireless communication may include memory and one or more processors coupled with the memory. The memory and the one or more processors may be configured to determine a transmission type for a physical downlink shared channel, wherein the transmission type is a multicast transmission type or a unicast transmission type; determine, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel; and decode the physical downlink shared channel based at least in part on the transmission configuration indicator state.

In some aspects, a non-transitory computer-readable medium may store one or more instructions for wireless communication. The one or more instructions, when executed by one or more processors of a UE, may cause the one or more processors to determine a transmission type for a physical downlink shared channel, wherein the transmission type is a multicast transmission type or a unicast transmission type; determine, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel; and decode the physical downlink shared channel based at least in part on the transmission configuration indicator state.

In some aspects, an apparatus for wireless communication may include means for determining a transmission type for a physical downlink shared channel, wherein the transmission type is a multicast transmission type or a unicast transmission type; means for determining, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel; and means for decoding the physical downlink shared channel based at least in part on the transmission configuration indicator state.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
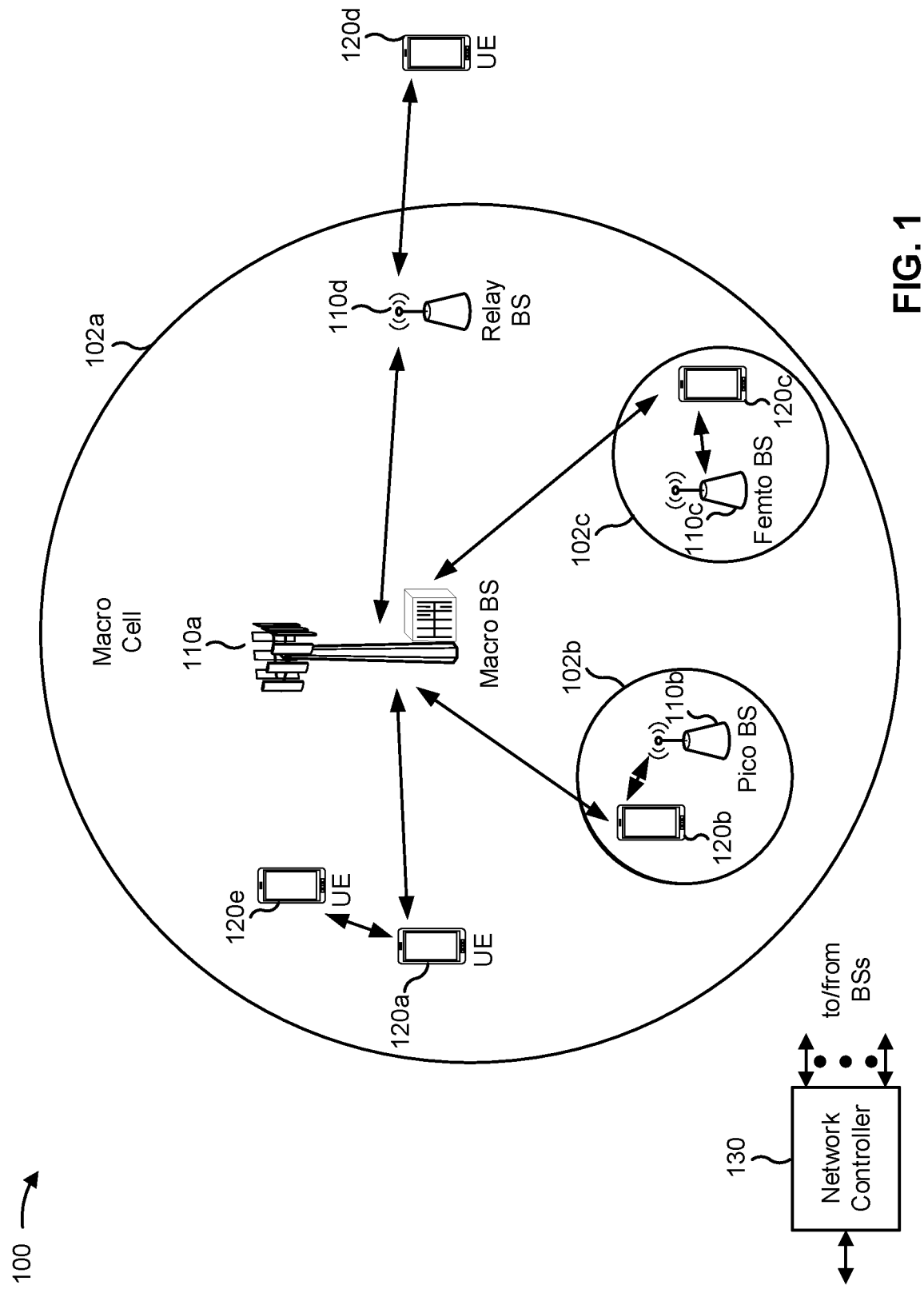
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
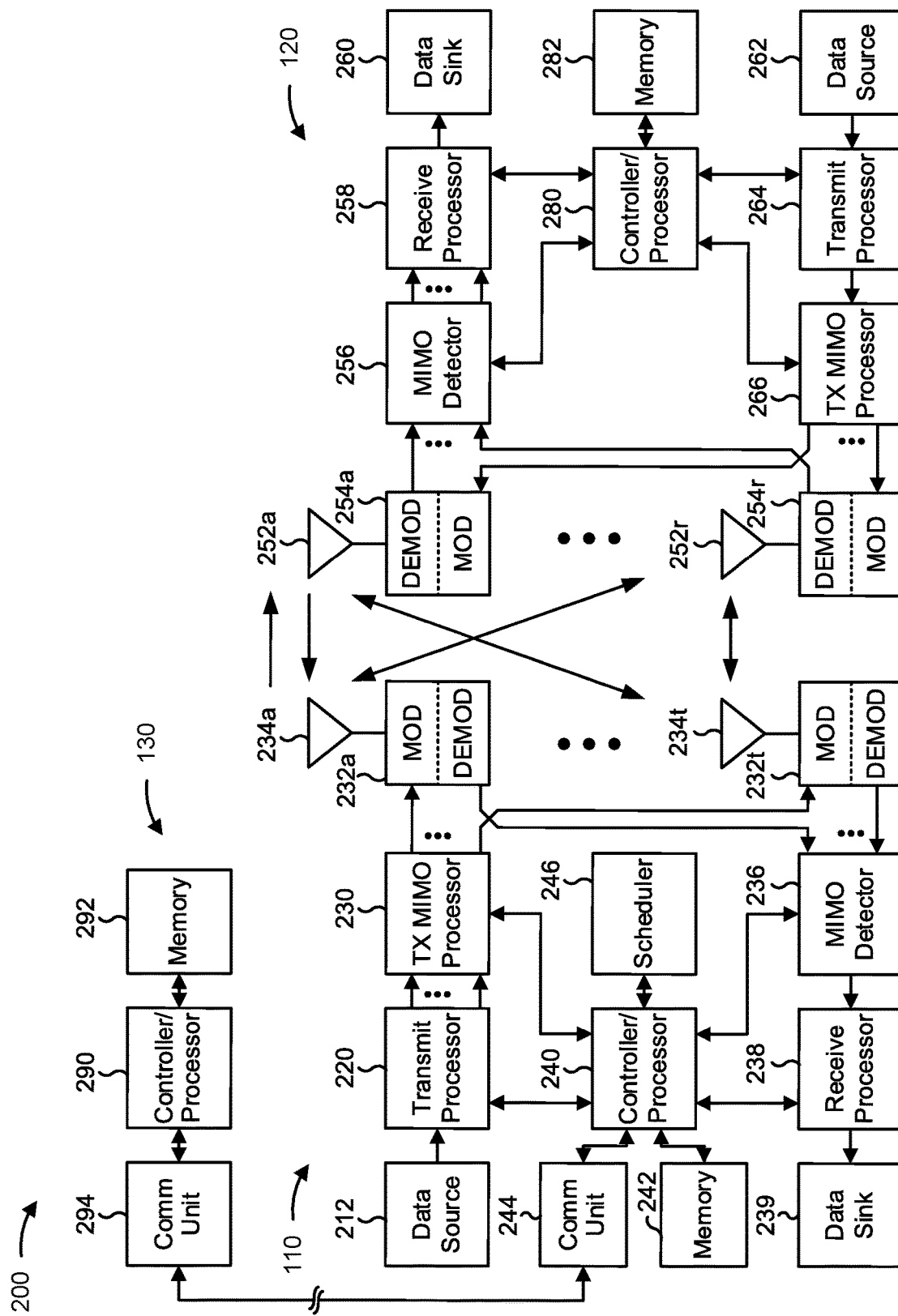
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmission configuration indicator determination for mixed mode operation, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for determining a transmission type for a physical downlink shared channel, wherein the transmission type is a multicast transmission type or a unicast transmission type, means for determining, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel, means for decoding the physical downlink shared channel based at least in part on the transmission configuration indicator state, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
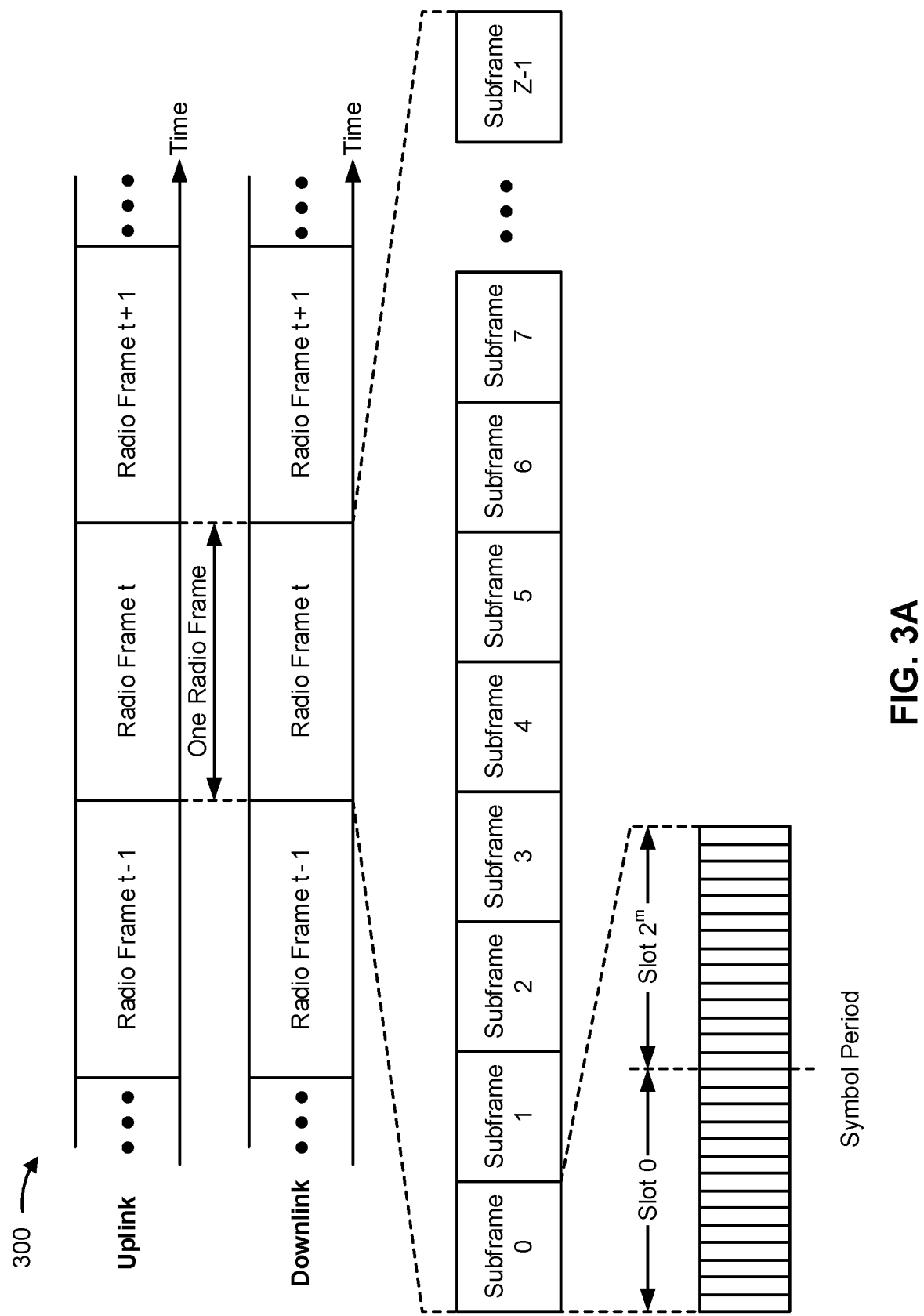
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
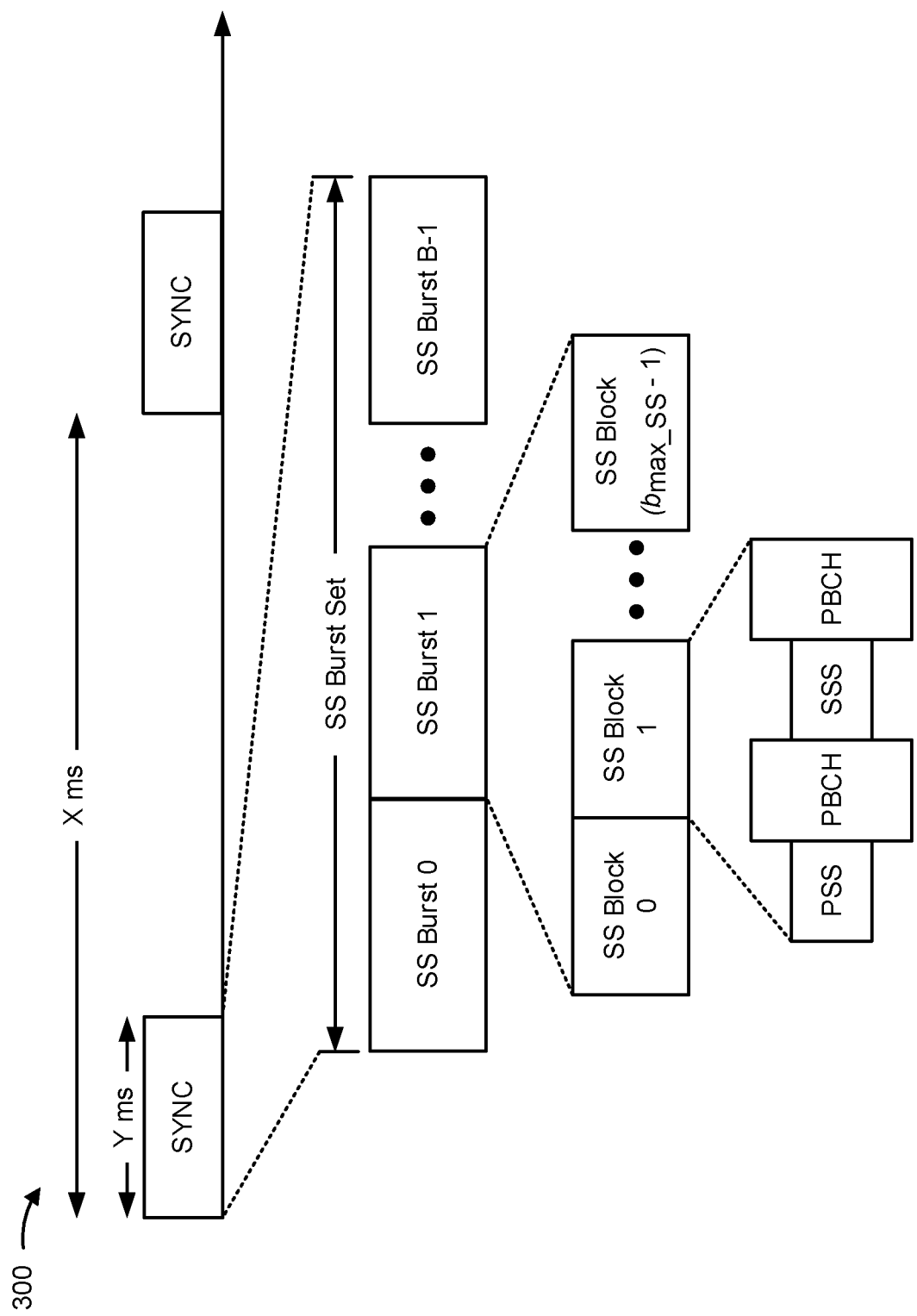
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
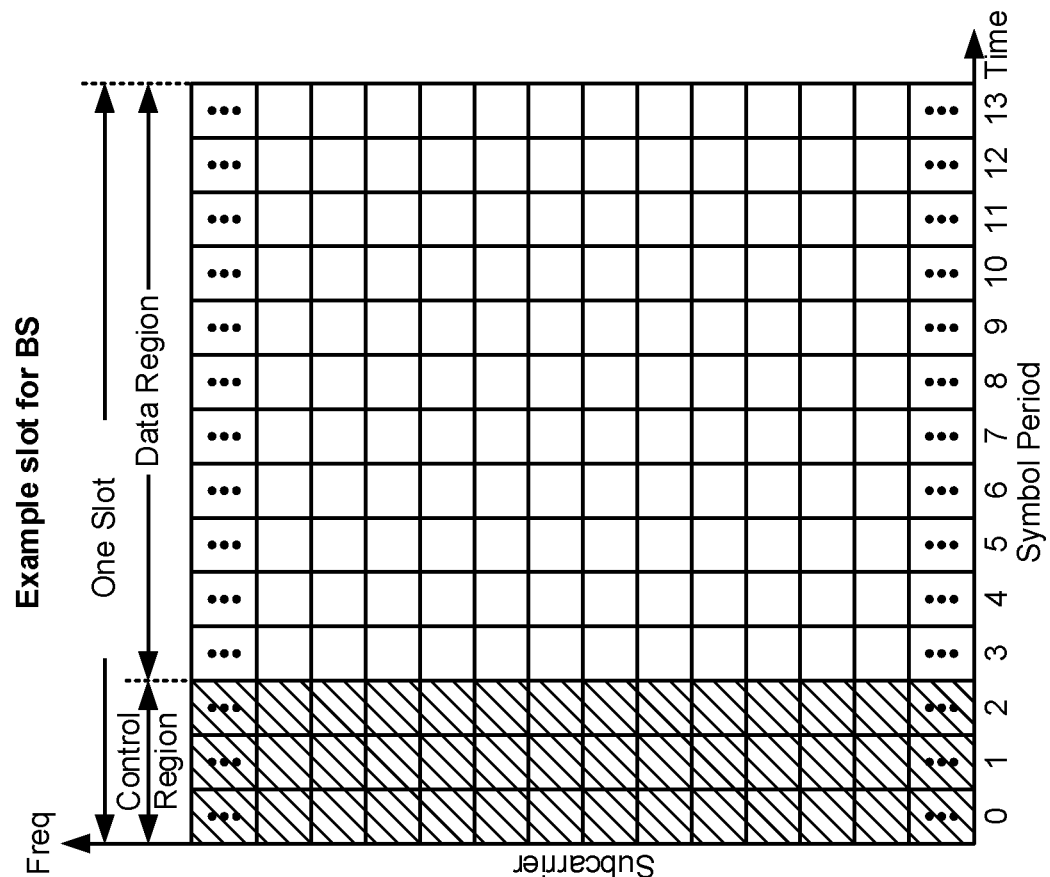
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with pre-coding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
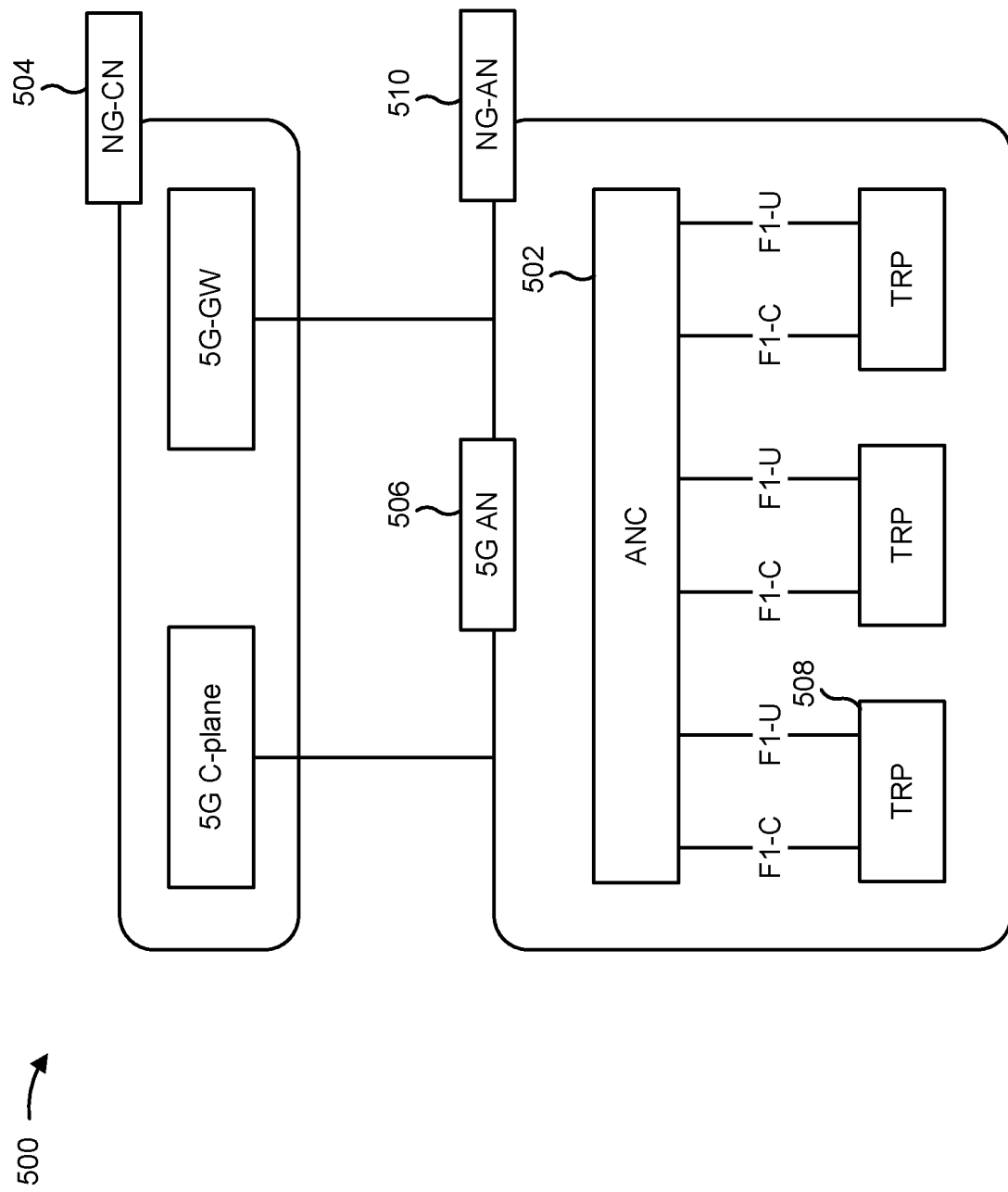
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
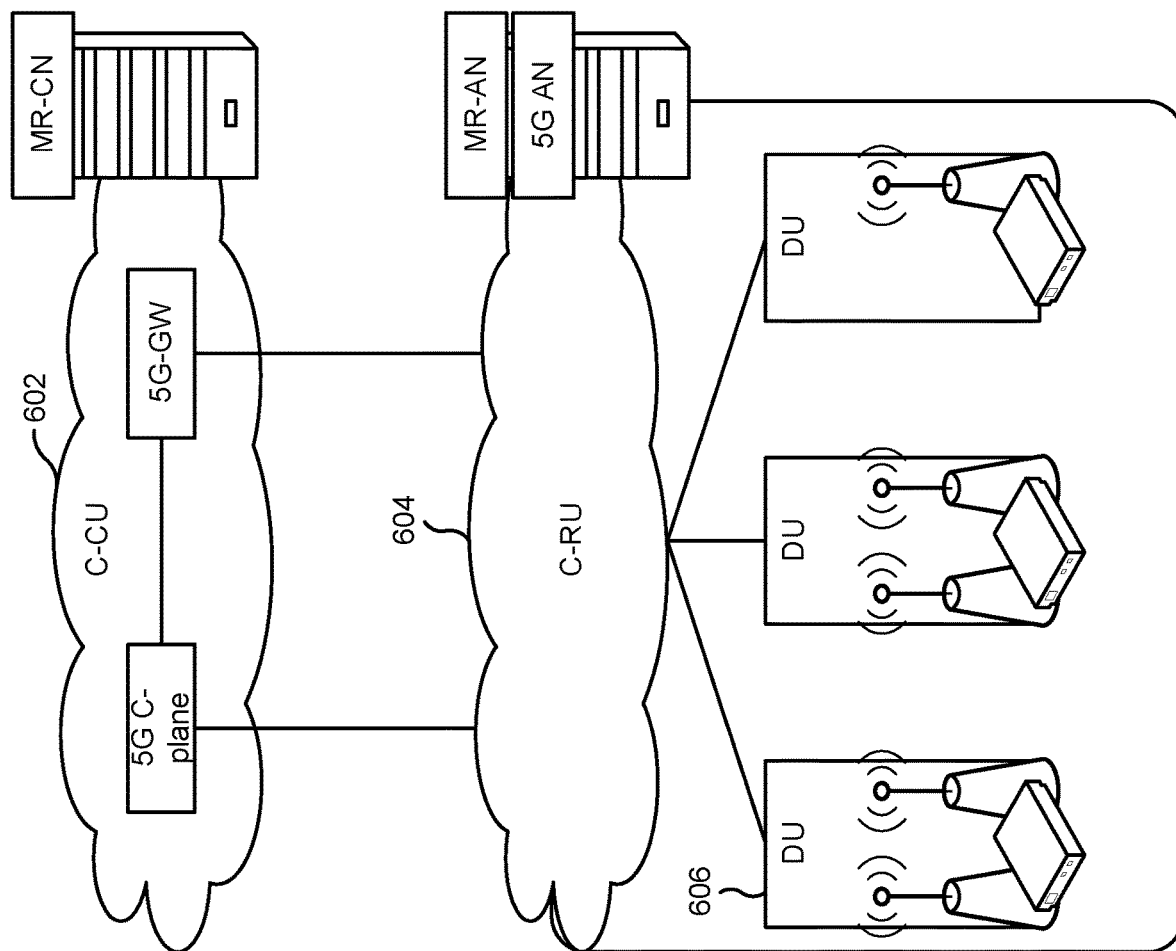
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

Some communications systems, such as NR, allow mixed mode operation. For example, a BS may be configured to transmit, in some cases, a unicast transmission, and in other cases a multicast transmission. A UE may use an assumption of a quasi-co-location (QCL) property to decode a transmission from the BS, where the assumption of a QCL property of a transmission is identified based on a set of implicit rules or an explicit configuration. For example, if a UE does not store a configuration for determining a QCL assumption of a transmission, then the UE may determine that transmission has the same QCL property with a particular reference signal (RS). Additionally, or alternatively, if a UE does store a configuration for determining a QCL assumption of a transmission, the UE may determine that the transmission has the same QCL property as a particular RS.

The configuration providing QCL assumption may be a transmission configuration indicator (TCI) state. Each TCI state has information identifying one or two RSs (e.g., which may be a specified synchronization signal block (SSB) or channel state information reference signal (CSI-RS)) and a type of the QCL property for each RS (e.g., information identifying a QCL relationship in terms of Doppler shift, Doppler spread, average delay, delay spread, and/or Spatial Rx parameter).

However, different transmissions may be associated with different RSs that may require different QCL assumptions. For example, a multicast transmission may be quasi-co-located with at least in part on a cell-defining SSB, while a unicast transmission may be quasi-co-located with at least in part on a CSI-RS resource that is configured for monitoring by UE-specific higher layer signaling. Similarly, a QCL source (e.g., one or more SSBs or CSI-RSs with the same QCL properties) for a multicast transmission may be based at least in part on a CSI-RS resource that is transmitted across a plurality of cells (e.g., transmitted over a wide area across multiple transmit receive points (TRPs)) in a synchronous manner; but, a QCL source for a unicast transmission may be based at least in part on a CSI-RS resource that is transmitted only in a single cell (e.g., transmitted over a particular area covered by a TRP). Similarly, a beam width may be relatively wide for multicast transmission and relatively narrow for unicast transmission, in which case associated QCL properties maybe different.

Further, for a given multicast service, a plurality of assumptions of QCL properties may be possible. For example, a QCL assumption for a physical downlink control channel (PDCCH) that schedules a multicast data transmission may be based at least in part on a cell-defining SSB, but a QCL assumption for the multicast data transmission (e.g., a physical downlink shared channel (PDSCH)) scheduled by the PDCCH may be based at least in part on a UE-specific CSI-RS. Similarly, a QCL source for a PDCCH may be based at least in part on a multi-cell common CSI-RS resource, but a QCL source for a PDSCH may be based at least in part on a single-cell CSI-RS. Similarly, a beam width for a PDCCH may be relatively wide and a beam width for a PDSCH may be relatively narrow.

For a PDSCH, the QCL property may be the same as that for the control resource set (CORESET) in which a corresponding PDCCH is received, for a CORESET that has a lowest index value in a latest slot where a search space is monitored, or for a value that is indicated by a transmission configuration indicator (TCI) state of a downlink control information (DCI) message.

Thus, some aspects described herein enable TCI determination for mixed mode operation. For example, a UE may determine a transmission type for a PDSCH, may determine a TCI state based at least in part on the transmission type, and may decode the PDSCH based at least in part on the TCI state. In this case, based at least in part on determining the TCI state, the UE may determine a configuration for QCL property that may include a QCL assumption, a QCL source, a beam width, and/or the like. In this way, the UE enables decoding of a PDSCH. For example, the UE may assume that a PDSCH is quasi-co-located with a reference signal associated with the QCL information identified by a TCI state for the PDSCH. In this way, the UE enables decoding of transmissions from a BS in mixed mode operation.

Figure 7:
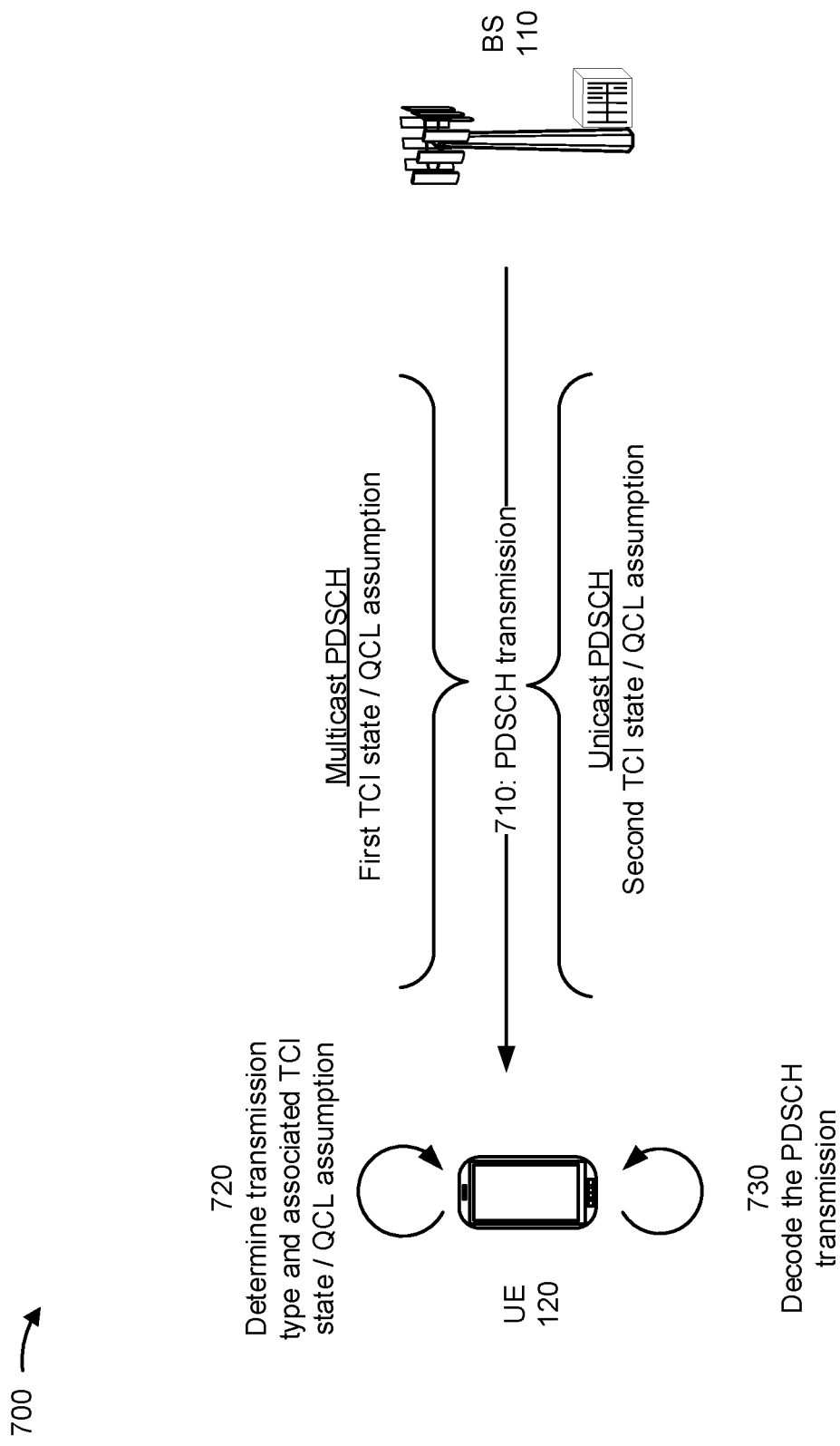
FIG. 7 is a diagram illustrating an example of transmission configuration indicator determination for mixed mode operation, in accordance with various aspects of the present disclosure.

FIG. 7 is a diagram illustrating an example 700 of transmission configuration indicator determination for mixed mode operation, in accordance with various aspects of the present disclosure. As shown in FIG. 7, example 700 includes a BS 110 and a UE 120.

As further shown in FIG. 7, and by reference number 710, UE 120 may receive a transmission from BS 110. For example, UE 120 may receive the PDSCH transmission from BS 110. In some aspects, the transmission may be a particular transmission type. For example, UE 120 may receive a unicast PDSCH transmission, a multicast PDSCH transmission, and/or the like. In some aspects, the transmission may be associated with a particular scrambling configuration. For example, UE 120 may receive a PDSCH transmission with a cyclic redundancy check (CRC) scrambled using a particular type of radio network temporary identifier (RNTI), as described in more detail herein. In some aspects, the transmission may be scheduled by another transmission. For example, UE 120 may receive PDCCH transmission scheduling resources for the PDSCH transmission, and may subsequently receive the PDSCH transmission using the resources scheduled for the PDSCH transmission.

As further shown in FIG. 7, and by reference number 720, UE 120 may determine a transmission type and an associated TCI state and/or associated QCL assumption. For example, UE 120 may determine that the transmission is a multicast PDSCH transmission and is associated with a first TCI state, a first QCL assumption, and/or the like. Additionally, or alternatively, UE 120 may determine that the transmission is a unicast PDSCH transmission and is associated with a second TCI state, a second QCL assumption, and/or the like.

In some aspects, UE 120 may determine that the transmission is a unicast PDSCH based at least in part on use of a particular scrambling configuration associated with an RNTI. For example, UE 120 may determine that a unicast PDSCH has a CRC that is scrambled based at least in part on a cell RNTI (C-RNTI), a configured scheduling RNTI (CS-RNTI), a modulation and coding scheme (MCS) C-RNTI (MCS-C-RNTI), and/or the like. Additionally, or alternatively, UE 120 may determine that the transmission is a unicast PDSCH based at least in part on the transmission being scheduled by a PDCCH with a CRC that is scrambled by a C-RNTI, a CS-RNTI, an MCS-C-RNTI, and/or the like.

In some aspects, UE 120 may determine that the transmission is a multicast PDSCH based at least in part on use of a group RNTI (G-RNTI) to scramble the transmission. Additionally, or alternatively, UE 120 may determine that the transmission is a multicast PDSCH based at least in part on the transmission being scheduled by a PDCCH with a CRC that is scrambled by a G-RNTI. In this case, BS 110 may configure the G-RNTI for a group of UEs, including UE 120, that receive the same PDSCH and have the same higher-layer configuration.

In some aspects, UE 120 may determine a TCI state, which may correspond to a QCL assumption, for the transmission based at least in part on an indicator. For example, UE 120 may determine that a DCI in a CORESET indicates the TCI state for a unicast transmission, a multicast transmission, and/or the like. In this case, BS 110 may configure the DCI for both the unicast transmission and the multicast transmission. Additionally, or alternatively, UE 120 may determine the TCI state based at least in part on a DCI, in a CORESET, that is configured separately for a unicast transmission (e.g., a first DCI) and a multicast transmission (e.g., a second DCI). In this case, based at least in part on determining the type of the transmission, UE 120 may determine the TCI state based at least in part on the DCI.

In some aspects, UE 120 may select the TCI state from a TCI state pool. For example, UE 120 may determine an association between a scheduling DCI and a TCI state of a TCI state pool configured in a PDSCH configuration message. In this case, UE 120 may determine the same association to the same TCI state for a multicast transmission and for a unicast transmission. For example, UE 120 may determine that a TCI state index identifies a particular TCI state in the TCI state pool. Additionally, or alternatively, UE 120 may use a first association to a first TCI state for a multicast transmission and a second association to a second TCI state for a unicast transmission. In some aspects, UE 120 may use different TCI state pools for different types of transmissions. For example, a connected mode UE 120 may determine the TCI state pool for a multicast transmission based at least in part on a UE-specific radio resource control (RRC) message (e.g., in a PDSCH configuration message). Alternatively, an idle mode UE 120, an inactive mode UE 120, or a connected mode UE 120 may determine the TCI state pool for a unicast transmission based at least in part on a UE-common RRC message.

In some aspects, UE 120 may determine to activate or deactivate a TCI state. For example, UE 120 may receive a medium access control (MAC) control element (CE) to activate a set of TCI states from which to select a TCI state for multicast transmissions and unicast transmissions. Additionally, or alternatively, UE 120 may receive a first MAC CE to activate TCI states for selection for multicast transmissions and a second MAC CE to activate TCI states for selection for unicast transmissions. In this case, UE 120 may select from a particular quantity of activated TCI states that may be determined based at least in part on a quantity of bits reserved for activating and/or deactivating TCI states. For example, based at least in part on the quantity of bits in a signaling message, BS 110 may configure a maximum quantity of concurrently active TCI states (e.g., 8 TCI states, 16 TCI states, 64 TCI states, and/or the like). In some aspects, the maximum quantity may be selected based at least in part on a UE capability, and UE 120 may report the UE capability to BS 110 to cause BS 110 to activate a quantity of TCI states that is less than or equal to the maximum quantity of TCI states.

In some aspects, UE 120 may determine the TCI state without receiving a scheduling DCI from BS 110 (e.g., based at least in part on transmission of the scheduling DCI not being available or not being enabled). For example, UE 120 may determine the TCI state for a current slot based at least in part on whether a monitored search space in a previous slot is for multicast (e.g., a common search space (CSS) with a C-RNTI or a UE-specific search space (USS)) or unicast (e.g., a master search space (MSS) or a search space with a G-RNTI). Additionally, or alternatively, when a search space for multicast and a search space for unicast are monitored, UE 120 may determine the TCI state based at least in part on a QCL assumption of a CORESET with a lowest index in a most recent slot with a search space for unicast, a most recent slot with a search space for multicast, or any most recent slot.

As further shown in FIG. 7, and by reference number 730, UE 120 may decode the PDSCH transmission. For example, UE 120 may decode the PDSCH transmission based at least in part on the TCI state, the QCL assumption, and/or the like of the PDSCH transmission. In this way, UE 120 may decode PDSCH transmissions in mixed mode operation.

As indicated above, FIG. 7 is provided as an example. Other examples may differ from what is described with respect to FIG. 7.

Figure 8:
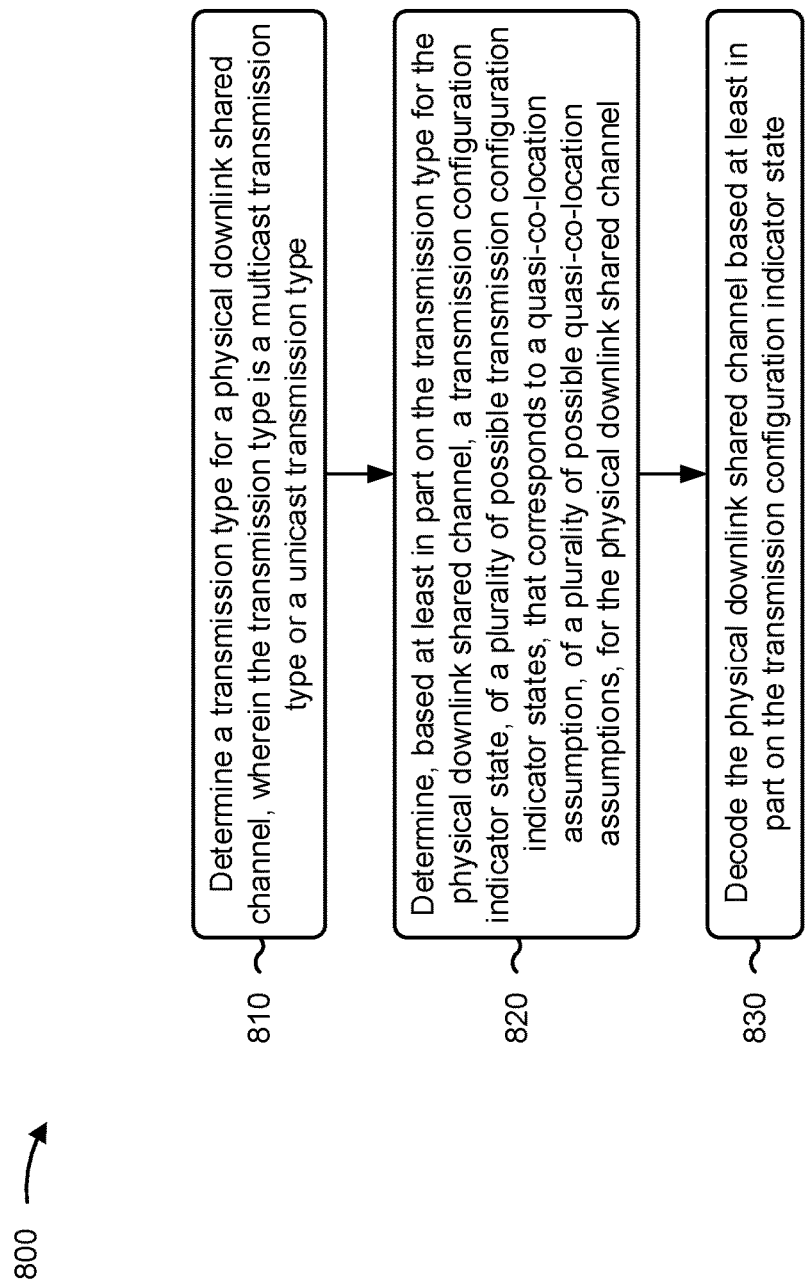
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations associated with transmission configuration indicator determination for mixed mode operation.

As shown in FIG. 8, in some aspects, process 800 may include determining a transmission type for a physical downlink shared channel, wherein the transmission type is a multicast transmission type or a unicast transmission type (block 810). For example, the UE (e.g., using receive processor 258, transmit processor 264, controller/processor 280, memory 282, and/or the like) may determine a transmission type for a physical downlink shared channel, as described above. In some aspects, the transmission type is a multicast transmission type or a unicast transmission type.

As further shown in FIG. 8, in some aspects, process 800 may include determining, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel (block 820). For example, the UE (e.g., using receive processor 258, transmit processor 264, controller/processor 280, memory 282, and/or the like) may determine, based at least in part on the transmission type for the physical downlink shared channel, a transmission con-figuration indicator state, of a plurality of possible transmission configuration indicator states, that corresponds to a quasi-co-location assumption, of a plurality of possible quasi-co-location assumptions, for the physical downlink shared channel, as described above.

As further shown in FIG. 8, in some aspects, process 800 may include decoding the physical downlink shared channel based at least in part on the transmission configuration indicator state (block 830). For example, the UE (e.g., using receive processor 258, transmit processor 264, controller/processor 280, memory 282, and/or the like) may decode the physical downlink shared channel based at least in part on the transmission configuration indicator state, as described above.

Process 800 may include additional aspects, such as any single aspect or any combination of aspects described below and/or in connection with one or more other processes described elsewhere herein.

In a first aspect, determining the transmission type includes determining the transmission type based at least in part on a type of scrambling identifier for a cyclic redundancy check of the physical downlink shared channel or a type of scrambling identifier for a cyclic redundancy check of a physical downlink control channel scheduling the physical downlink shared channel.

In a second aspect, alone or in combination with the first aspect, determining the transmission configuration indicator state includes determining the transmission configuration indicator state based at least in part on a downlink control information parameter.

In a third aspect, alone or in combination with one or more of the first and second aspects, the downlink control information parameter is a common parameter for a control resource set that is effective for the multicast transmission type and the unicast transmission type.

In a fourth aspect, alone or in combination with one or more of the first through third aspects, the downlink control information parameter is a transmission type-specific parameter for a control resource set that is effective for the multicast transmission type or the unicast transmission type.

In a fifth aspect, alone or in combination with one or more of the first through fourth aspects, the downlink control information parameter has, for the multicast transmission type and the unicast transmission type, a single association to a transmission configuration indicator state index in a transmission configuration indicator state pool, which is for the multicast transmission type and the unicast transmission type.

In a sixth aspect, alone or in combination with one or more of the first through fifth aspects, the downlink control information parameter has, for the multicast transmission type, a first association to a first transmission configuration indicator state index in a transmission configuration indicator state pool, which is for the multicast transmission type and the unicast transmission type, and, for the unicast transmission type, a second association to a second transmission configuration indicator state index in the transmission configuration indicator state pool.

In a seventh aspect, alone or in combination with one or more of the first through sixth aspects, the downlink control information parameter identifies the transmission configuration indicator state from a transmission configuration indicator state pool that is configured for the multicast transmission type, based at least in part on a UE-specific radio resource control signal.

In an eighth aspect, alone or in combination with one or more of the first through seventh aspects, the downlink control information parameter identifies the transmission configuration indicator state from a transmission configuration indicator state pool that is configured for the multicast transmission type, based at least in part on a UE-common radio resource control signal.

In a ninth aspect, alone or in combination with one or more of the first through eighth aspects, a MAC CE parameter identifies, for the unicast transmission type and the multicast transmission type, a single set of transmission configuration indicator states of a transmission configuration indicator state pool configured for the multicast transmission type and the unicast transmission type.

In a tenth aspect, alone or in combination with one or more of the first through ninth aspects, a MAC CE parameter identifies, for the unicast transmission type, a first set of transmission configuration indicator states and, for the multicast transmission type, a second set of transmission configuration indicator states of a transmission configuration indicator state pool configured for the multicast transmission type and the unicast transmission type.

In an eleventh aspect, alone or in combination with one or more of the first through tenth aspects, a MAC CE parameter identifies the transmission configuration indicator state from a transmission configuration indicator state pool that is configured for the multicast transmission type, based at least in part on a UE-specific radio resource control signal.

In a twelfth aspect, alone or in combination with one or more of the first through eleventh aspects, a MAC CE parameter identifies the transmission configuration indicator state from a transmission configuration indicator state pool that is configured for the multicast transmission type, based at least in part on a UE-common radio resource control signal.

In a thirteenth aspect, alone or in combination with one or more of the first through twelfth aspects, process 800 includes reporting a UE capability corresponding to a maximum quantity of active transmission configuration indicator states; and determining a set of active transmission configuration indicator states from which to select the transmission configuration indicator state, based at least in part on reporting the UE capability.

In a fourteenth aspect, alone or in combination with one or more of the first through thirteenth aspects, determining the transmission configuration indicator state includes determining the transmission configuration indicator state in a current slot based at least in part on a type of transmission for which a search space is configured in a previous slot.

In a fifteenth aspect, alone or in combination with one or more of the first through fourteenth aspects, determining the transmission configuration indicator state includes determining the transmission configuration indicator state in a current slot based at least in part on a control resource set quasi-co-location parameter for the previous slot.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
 determining a transmission type, of a plurality of possible transmission types including a second transmission type different from the transmission type, for a physical downlink shared channel, wherein each of the transmission type and the second transmission type is a multicast transmission type or a unicast transmission type;
 determining, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel, wherein the second transmission type is associated with at least one of:
- a second configuration indicator state, of the plurality of possible transmission configuration indicator states, or
- a second quasi-co-location assumption, of the plurality of possible quasi-co-location assumptions, for the physical downlink shared channel; and decoding the physical downlink shared channel based at least in part on the transmission configuration indicator state.

2. The method of claim 1, wherein determining the transmission type comprises:
determining the transmission type based at least in part on:
- a type of scrambling identifier for a cyclic redundancy check of the physical downlink shared channel, or
- a type of scrambling identifier for a cyclic redundancy check of a physical downlink control channel scheduling the physical downlink shared channel.

3. The method of claim 1, wherein determining the transmission configuration indicator state comprises:
determining the transmission configuration indicator state based at least in part on a downlink control information parameter.

4. The method of claim 3, wherein the downlink control information parameter is a common parameter for a control resource set that is effective for the multicast transmission type and the unicast transmission type.

5. The method of claim 3, wherein the downlink control information parameter is a transmission type-specific parameter for a control resource set that is effective for the multicast transmission type or the unicast transmission type.

6. The method of claim 3, wherein the downlink control information parameter has, for the multicast transmission type and the unicast transmission type, a single association to a transmission configuration indicator state index in a transmission configuration indicator state pool, which is for the multicast transmission type and the unicast transmission type.

7. The method of claim 3, wherein the downlink control information parameter has, for the multicast transmission type, a first association to a first transmission configuration indicator state index in a transmission configuration indicator state pool, which is for the multicast transmission type and the unicast transmission type, and, for the unicast transmission type, a second association to a second transmission configuration indicator state index in the transmission configuration indicator state pool.

8. The method of claim 3, wherein the downlink control information parameter identifies the transmission configuration indicator state from a transmission configuration indicator state pool that is configured for the multicast transmission type, based at least in part on a UE-specific radio resource control signal.

9. The method of claim 3, wherein the downlink control information parameter identifies the transmission configuration indicator state from a transmission configuration indicator state pool that is configured for the multicast transmission type, based at least in part on a UE-common radio resource control signal.

10. The method of claim 1, wherein a medium access control (MAC) control element (CE) parameter identifies, for the unicast transmission type and the multicast transmission type, a single set of transmission configuration indicator states of a transmission configuration indicator state pool configured for the multicast transmission type and the unicast transmission type.

11. The method of claim 1, wherein a medium access control (MAC) control element (CE) parameter identifies, for the unicast transmission type, a first set of transmission configuration indicator states and, for the multicast transmission type, a second set of transmission configuration indicator states of a transmission configuration indicator state pool configured for the multicast transmission type and the unicast transmission type.

12. The method of claim 1, wherein a medium access control (MAC) control element (CE) parameter identifies the transmission configuration indicator state from a transmission configuration indicator state pool that is configured for the multicast transmission type, based at least in part on a UE-specific radio resource control signal.

13. The method of claim 1, wherein a medium access control (MAC) control element (CE) parameter identifies the transmission configuration indicator state from a transmission configuration indicator state pool that is configured for the multicast transmission type, based at least in part on a UE-common radio resource control signal.

14. The method of claim 1, further comprising:
reporting a UE capability corresponding to a maximum quantity of active transmission configuration indicator states; and
determining a set of active transmission configuration indicator states from which to select the transmission configuration indicator state, based at least in part on reporting the UE capability.

15. The method of claim 1, wherein determining the transmission configuration indicator state comprises:
determining the transmission configuration indicator state in a current slot based at least in part on a third transmission type, of the plurality of possible transmission types, for which a search space is configured in a previous slot.

16. The method of claim 15, wherein determining the transmission configuration indicator state comprises:
determining the transmission configuration indicator state in the current slot based at least in part on a control resource set quasi-co-location parameter for the previous slot.

17. A user equipment (UE) for wireless communication, comprising:
a memory; and
one or more processors coupled to the memory, the one or more processors configured to:
determine a transmission type, of a plurality of possible transmission types including a second transmission type different from the transmission type, for a physical downlink shared channel, wherein each of the transmission type and the second transmission type is a multicast transmission type or a unicast transmission type;
determine, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel, wherein the second transmission type is associated with at least one of:

a second configuration indicator state, of the plurality of possible transmission configuration indicator states, or
a second quasi-co-location assumption, of the plurality of possible quasi-co-location assumptions, for the physical downlink shared channel; and
decode the physical downlink shared channel based at least in part on the transmission configuration indicator state.

18. The UE of claim 17, wherein the one or more processors, when determining the transmission type, are configured to:
determine the transmission type based at least in part on:
a type of scrambling identifier for a cyclic redundancy check of the physical downlink shared channel, or
a type of scrambling identifier for a cyclic redundancy check of a physical downlink control channel scheduling the physical downlink shared channel.

19. The UE of claim 17, wherein the one or more processors, when determining the transmission configuration indicator state, are configured to:
determine the transmission configuration indicator state based at least in part on a downlink control information parameter.

20. The UE of claim 19, wherein the downlink control information parameter is a common parameter for a control resource set that is effective for the multicast transmission type and the unicast transmission type.

21. The UE of claim 19, wherein the downlink control information parameter is a transmission type-specific parameter for a control resource set that is effective for the multicast transmission type or the unicast transmission type.

22. A non-transitory computer-readable medium storing a set of instructions for wireless communication, the set of instructions comprising:
one or more instructions that, when executed by one or more processors of a user equipment (UE), cause the UE to:
determine a transmission type, of a plurality of possible transmission types including a second transmission type different from the transmission type, for a physical downlink shared channel, wherein each of the transmission type and the second transmission type is a multicast transmission type or a unicast transmission type;
determine, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel, wherein the second transmission type is associated with at least one of:
a second configuration indicator state, of the plurality of possible transmission configuration indicator states, or
a second quasi-co-location assumption, of the plurality of possible quasi-co-location assumptions, for the physical downlink shared channel; and
decode the physical downlink shared channel based at least in part on the transmission configuration indicator state.

23. The non-transitory computer-readable medium of claim 22, wherein the one or more instructions, that cause the UE to determine the transmission type, cause the UE to:
determine the transmission type based at least in part on:
a type of scrambling identifier for a cyclic redundancy check of the physical downlink shared channel, or
a type of scrambling identifier for a cyclic redundancy check of a physical downlink control channel scheduling the physical downlink shared channel.

24. The non-transitory computer-readable medium of claim 22, wherein the one or more instructions, that cause the UE to determine the transmission configuration indicator state, cause the UE to:
determine the transmission configuration indicator state based at least in part on a downlink control information parameter.

25. The non-transitory computer-readable medium of claim 24, wherein the downlink control information parameter is a common parameter for a control resource set that is effective for the multicast transmission type and the unicast transmission type.

26. The non-transitory computer-readable medium of claim 24, wherein the downlink control information parameter is a transmission type-specific parameter for a control resource set that is effective for the multicast transmission type or the unicast transmission type.

27. An apparatus for wireless communication, comprising:
means for determining a transmission type, of a plurality of possible transmission types including a second transmission type different from the transmission type, for a physical downlink shared channel, wherein each of the transmission type and the second transmission type is a multicast transmission type or a unicast transmission type;
means for determining, based at least in part on the transmission type for the physical downlink shared channel, a transmission configuration indicator state, of a plurality of possible transmission configuration indicator states, that corresponds to a quasi-co-location assumption, of a plurality of possible quasi-co-location assumptions, for the physical downlink shared channel, wherein the second transmission type is associated with at least one of:
a second configuration indicator state, of the plurality of possible transmission configuration indicator states, or
a second quasi-co-location assumption, of the plurality of possible quasi-co-location assumptions, for the physical downlink shared channel; and
means for decoding the physical downlink shared channel based at least in part on the transmission configuration indicator state.

28. The apparatus of claim 27, wherein the means for determining the transmission type comprises:
means for determining the transmission type based at least in part on:
a type of scrambling identifier for a cyclic redundancy check of the physical downlink shared channel, or
a type of scrambling identifier for a cyclic redundancy check of a physical downlink control channel scheduling the physical downlink shared channel.

29. The apparatus of claim 27, wherein the means for determining the transmission configuration indicator state comprises:
means for determining the transmission configuration indicator state based at least in part on a downlink control information parameter.

30. The apparatus of claim 29, wherein the downlink control information parameter is a common parameter for a control resource set that is effective for the multicast transmission type and the unicast transmission type.

\* \* \* \* \*